United States Patent [19]

Kumar et al.

[11] Patent Number: 5,248,642
[45] Date of Patent: Sep. 28, 1993

[54] CATALYTIC CRACKING CATALYSTS AND ADDITIVES

[75] Inventors: Ranjit Kumar, Columbia; Ronald E. Ritter, Ellicott City; Howard J. Schaeffer, III, Baltimore, all of Md.

[73] Assignee: W. R. Grace & Co.-Conn., New York, N.Y.

[21] Appl. No.: 928,391

[22] Filed: Aug. 12, 1992

Related U.S. Application Data

[63] Continuation-in-part of Ser. No. 877,568, May 1, 1992, abandoned.

[51] Int. Cl.⁵ .................. B01J 21/16; B01J 23/10; B01J 29/04
[52] U.S. Cl. .................................. 502/65; 502/73
[58] Field of Search .................... 502/65, 73, 302

[56] References Cited

U.S. PATENT DOCUMENTS

| | | | |
|---|---|---|---|
| 3,930,987 | 1/1976 | Grand | 208/111 |
| 4,187,199 | 2/1980 | Csicery | 502/73 |
| 4,443,553 | 4/1984 | Chiang et al. | 502/65 |
| 4,465,779 | 8/1984 | Occelli et al. | 502/63 |
| 4,515,683 | 5/1985 | Beck et al. | 502/63 |
| 4,843,052 | 6/1989 | Lussier | 502/68 |
| 4,921,824 | 5/1990 | Chin et al. | 208/113 |
| 4,940,531 | 7/1990 | Lussier | 208/120 |

FOREIGN PATENT DOCUMENTS 0074581 3/1983 European Pat. Off. ............ 502/73
2140791 12/1984 United Kingdom .

Primary Examiner—Carl F. Dees
Attorney, Agent, or Firm—Arthur P. Savage

[57] ABSTRACT

Catalytic cracking catalysts/additives which comprise rare-earth, preferably lanthanum, oxide and/or oxychloride dispersed in an acid reacted metakaolin matrix. The catalysts/additives may be combined with zeolite-containing cracking catalysts to enhance catalytic activity/selectivity in the presence of metals (Ni and V).

18 Claims, No Drawings

CATALYTIC CRACKING CATALYSTS AND ADDITIVES

This application is a continuation-in-part of U.S. Ser. No. 877,568, filed May 1, 1992, and now abandoned.

The present invention relates to catalytic cracking catalysts, and more particularly, to cracking catalyst/additive compositions which are capable of converting metals-containing hydrocarbon feedstocks into valuable products such as gasoline and diesel fuel.

When zeolite-containing cracking catalysts are used to process feedstocks which contain metals such as vanadium (V) and nickel (Ni), the metals are deposited on the catalyst in amounts that eventually cause loss of activity and the increased production of undesirable products such as hydrogen and coke.

The prior art discloses various methods for improving the catalytic cracking activity and selectivity of catalytic cracking catalysts in the presence of V when a rare-earth component is added to the catalyst.

U.S. Pat. No. 3,930,987 describes zeolite containing cracking catalysts which are impregnated with a solution of rare-earth salts. The soluble rare-earth salts which may be used to prepare the catalysts include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valerates, lactates, malanates, oxalates, palmitates, hydroxides, tartrates, and the like.

U.S. Pat. No. 4,515,683 discloses a method for passivating vanadium on catalytic cracking catalysts wherein lanthanum is nonionically precipitated on the catalyst prior to ordinary use. In a preferred embodiment lanthanum is precipitated by the addition of ammonium hydroxide or oxalic acid to a catalyst which has been previously impregnated with a rare-earth chloride solution.

U.S. Pat. No. 4,921,824 discloses an improved catalytic cracking catalyst which contains separate and discrete particles of lanthanum oxide. The lanthanum oxide particles are added separate from and along with the catalyst during the cracking process. The lanthanum oxide additive may include an inert matrix such as clay, silica and/or a metal oxide.

Great Britain 2 140 791 discloses the preparation of SOx gettering agents which comprise lanthanum oxide dispersed essentially as a monolayer on the surface of alumina. The lanthanum oxide-alumina compositions may be admixed with or incorporated in FCC catalysts that comprise zeolite, clay and an alumina sol binder such as aluminum chlorhydroxide.

U.S. Pat. No. 4,843,052 and U.S. Pat. No. 4,940,531 disclose acid-reacted metakaolin catalysts. The catalysts can be used for the catalytic cracking of hydrocarbon feedstocks that contain high levels of metals such as Ni and V.

U.S. Pat. No. 4,465,779 discloses modified cracking catalyst compositions which include a diluent that contains a magnesium compound. The compositions are used to process feedstocks having very high metals (Ni & V) content.

It is an object of the present invention to provide improved catalytic cracking catalyst and additive compositions that are highly effective for controlling the adverse effects of metals such as V and Ni.

It is a further object to provide zeolite containing catalytic cracking catalysts wherein significant improvement in catalyst performance is obtained by the addition of limited quantities of a novel rare-earth containing additive.

It is yet a further object to provide a method for preparing rare-earth containing cracking catalysts and additives in which the discrete particles of rare-earth compound, preferably lanthanum, are effectively and efficiently dispersed throughout the catalyst/additive particles.

An additional object is to provide an improved method for the catalytic cracking of hydrocarbons wherein the catalysts of the present invention are reacted under catalytic conditions with hydrocarbon feedstocks that contain significant quantities of metals such as V and Ni.

These and still further objects will become readily apparent to one skilled-in-the-art from the following detailed description and specific examples.

Broadly, our invention contemplates a particulate rare earth-containing catalyst/additive composition which comprises separate discrete particles of rare-earth, preferably lanthanum/neodynium (La/Nd), oxide and/or oxychloride, dispersed in an inorganic oxide matrix that includes an acid reacted metakaolin, and preferably, an alkaline metal oxide and/or a catalytically active zeolite/molecular sieve component.

More specifically, we have found that the catalytic performance of zeolite-containing cracking catalysts in the presence of Ni and V may be improved by combining the catalyst with a particulate rare-earth-containing additive which is obtained by combining finely divided rare-earth oxalate with acid reacted metakaolin having the mole composition 0.8 to 1.0 $Al_2O_3.2\ SiO_2$ and a surface area of above about 150 $m^2/g$, and optionally, calcium and/or magnesium oxide, and/or a zeolite/molecular sieve component, and/or an aluminum hydroxychloride sol, and forming and calcining the mixture to obtain hard, dense attrition resistant particles comprising rare-earth oxide and/or oxychloride dispersed in a catalytically active acid-reacted metakaolin/alumina matrix.

In a preferred practice of my invention, the lanthana-containing additive is prepared as follows:

(1) Preparing an aqueous slurry which contains finely divided rare-earth oxalate and acid reacted metakaolin; and optionally calcium and/or magnesium oxide (CaO and/or MgO) and a zeolite/molecular sieve component and acid aluminum sol.

(2) Spray drying the aqueous slurry which has a solids content of about 25 to 35 weight percent at a temperature of about 300° to 350° F. to obtain particles having a size range of 10 to 150 microns in which rare-earth oxalate particles are dispersed throughout an acid reacted metakaolin/aluminum sol matrix; and (3) Calcining the spray dried particles at a temperature of 1000° to 1200° F. for about 1 hour to convert the rare-earth oxalate to particles of rare-earth oxide and/or oxychloride, and to transform the spray dried particles into dense attrition resistant catalyst/additive particles.

Subsequent to calcination, the preferred compositions of our invention contain the following components (expressed as weight percent dry basis):

(1) Acid-reacted metakaolin 10 to 90, preferably 50 to 80.

(2) Rare-earth oxychloride/oxide 1 to 35, preferably 1 to 30.

(3) Alumina binder 0 to 10, preferably 2 to 5.

(4) Calcium/Magnesium oxide 0 to 10, preferably 2 to 5.

(5) Zeolite/molecular sieve component 0 to 50, and preferably 0 to 10.

The catalyst/additive particles possess the following catalytic and physical properties:
  (1) a microactivity of 15 to 80 as determined by ASTM 3907;
  (2) a Davison attrition Index of 1 to 15;
  (3) a density of 0.6 to 1.0 g/cc;
  (4) a surface area of 50 to 200 m$^2$/g.

The Davison Index (DI) is determined as follows:

A sample of catalyst is analyzed to determine the 0 to 20 micron size content. The sample is then subjected to a 1 hour test in a Fluid Catalyst Attrition Apparatus using a hardened steel jet cup having a precision bored orifice. An air flow of 21 liters a minute is used. The Davison Index is calculated as follows:

$$\text{Davison Index} = \frac{\text{wt. \% 0-20 micron material formed during test}}{\text{wt. original 20 + micron fraction}}$$

The acid reacted metakaolin used in the practice of our invention is described in U.S. Pat. No. 4,843,052 (incorporated herein by reference) and is obtained by heating kaolin at a temperature of about 700° to 910° C. for at least one minute to obtain reactive metakaolin. The reactive kaolin is then reacted with an acid, preferably hydrochloric, in amounts of up to about 1.5 moles of acid per mole of reactive metakaolin to obtain a reaction mixture that comprises acid-reacted metakaolin dispersed in an aqueous solution of acid leached alumina, i.e. aluminum chloride.

The acid reacted metal binder has the mole composition of about 0.8 to 1.0 Al$_2$O$_3$.2, a surface area of about 150 to 500 m$^2$/g, and a total nitrogen pore volume of about 0.15 to 0.50 cc/g as determined by ASTM-4222 and 4691.

In a preferred practice of the invention, the acid reacted metakaolin reaction mixture is combined with metallic aluminum powder to obtain an aluminum hydroxychloride sol binder. Alternatively, the acid reacted metakaolin may be recovered from the reaction mixture and used without an additional sol binder or may be combined with an aluminum hydrochloride sol such as Chlorhydrol, having the formulation Al$_{2+\mu}$(OH)$_{3\mu y}$Cl$_6$.

In another preferred embodiment the catalyst/additive composition will contain up to 10 weight percent and preferably 2 to 5 weight percent CaO and/or MgO which may be conveniently added to the rare earth oxalate slurry to maintain a slurry pH of above about 2.5 and preferably 3.5 to 4.5.

The rare-earth oxalate used in the practice of my invention may contain essentially 100 percent lanthanum/neodynium oxalate or may comprise oxalates wherein lanthanum/neodynium is present in combination with up to about 60 weight percent of other rare-earths such as cerium. The rare-earth oxalate may be conveniently prepared by reacting rare-earth hydrate (oxide, hydroxide, etc.) such as Molycorp Grade 5210 rare-earth hydrate having the rare-earth analysis expressed as weight percent oxide:

| | |
|---|---|
| La$_2$O$_3$ | 46 |
| Ce$_2$O$_3$ | 12 |
| Pr$_6$O$_{11}$ | 6 |
| Nd$_2$O$_3$ | 16 |
| Other (Cl, H$_2$O, etc.) | 20 | with oxalic acid to obtain precipitated rare-earth oxalate having a particle size range of 2 to 100 microns.

The catalyst/additive may be combined with commercial zeolite-containing fluid cracking catalysts (FCC), such as Octacat, Super-D, DA and XP catalysts manufactured and sold by the Davison Chemical Division of W. R. Grace & Co.-Conn. as a separate or an integral component. These catalysts typically comprise a zeolite/molecular sieve such as type X, Y, ultrastable Y (USY), rare earth exchanged Y (REY), Beta, and/or ZSM-5 dispersed in silica, alumina or silica-alumina clay matrix. Preferred zeolites are disclosed in U.S. Pat. Nos. 3,402,996 (CREX and CREY), 3,293,192, 3,449,070 (USY), 3,595,611, 3,607,043, 3,957,623 (PCY) and 3,676,368 (REHY). The FCC catalyst may be prepared in accordance with the teachings of U.S. Pat. No. 3,957,689, CA 967,136, U.S. Pat. Nos. 4,499,197, 4,542,118 and 4,458,023.

It is also contemplated that the above-noted zeolite/-molecular sieves may be incorporated in the catalysts/additives of the present invention to enhance the cracking activity.

The catalysts/additives of the present invention are preferably combined with the conventional zeolite containing FCC catalysts in amounts ranging from 5 to 25 weight percent, and more preferably 5 to 15 weight percent. The catalyst/additive may be combined with the FCC catalysts as a separate particulate component before or during use in a catalytic cracking process. Alternatively, the catalysts/additives may be incorporated in conventional FCC catalyst particles during manufacture.

The FCC/additive compositions are used in FCC processes conducted at cracking reaction temperatures of 500° to 600° C. and regeneration temperatures of 600° to 850° C. using hydrocarbon feedstocks that may contain up to 100 ppm or more of V and Ni. It is found that the presence of the additive during the FCC process passivates the adverse effects of metals such as vanadium and decreases the formation of hydrogen and coke. It is anticipated that use of the present additive will permit the successful use of FCC regeneration catalysts that contain as much as 10,000 to 20,000 ppm V.

Having described the basic aspects of my invention, the following examples are given to illustrate specific embodiments.

EXAMPLE 1

Preparation of Acid Reacted Metakaolin/Alumina Sol Binder

A 100 lb. sample of kaolin clay was calcined to 1680° F. and then reacted with 9.4 lbs of HCl (100% acid basis) and 280 lbs of H$_2$O at 214° F. for a period of 8 hours. Subsequently, 4.6 lbs of aluminum metal powder (Alcoa grade 120) was added and the reaction continued at 214° F. for 6 hours.

EXAMPLE 2

Preparation of Rare-Earth Oxalate

Precipitated rare-earth oxalate was prepared by combining 117.4 lbs of deionized water with 18.5 lbs oxalic acid ($C_2O_4H_2.2H_2O$) and heating the mixture to 100° F. Then 20.1 lbs rare-earth hydrate (Molycorp 5210) was added and the mixture was agitated for 1 hour. The resulting precipitated rare-earth oxalate slurry had a pH of below 1.0.

EXAMPLE 3

Preparation of Rare-Earth Oxalate/MgO Slurry 100 lbs (dry basis) of a rare-earth oxalate slurry prepared by the method of Example 2 was combined with 5.8 lbs of MgO. The resulting mixture had a pH of 4.0.

EXAMPLE 4

Preparation of Catalyst/Additive 158 lbs of MgO treated rare-earth oxalate slurry of Example 3 was mixed with 207.1 lbs of the acid-reacted reacted metakaolin/binder slurry of Example 1, mixed thoroughly spray dried at a temperature of 300° F. (control), and calcined at a material temperature of 1000° F. for 1 hour.

EXAMPLE 5

Large Batch Preparation

Oxalic acid solution was prepared by adding 0.214 lbs $C_2O_4H_2.2H_2O$ per 1 lb $H_2O$ (17.6%) and heating to 45° C. 9820 lbs of rare-earth hydrate, which contained 46 weight percent $La_2O_3$, was then combined with 51460 lbs of the oxalic acid solution. The pH of the mixture was adjusted by adding 1000 lbs MgO to obtain a pH=4.0. The resulting slurry comprised:

| | | |
|---|---|---|
| Rare-earth oxalate: | 17360 lbs | (27.9%) |
| MgO: | 1000 lbs | (1.61%) |
| Water: | 43920 lbs | (70.5%) |
| Total: | 62280 lbs | |

50,900 lbs of acid reacted metakaolin/aluminum sol binder slurry prepared as described in Example 1 (22.2 wt. % Solids) was added to 31,140 lbs of the oxalate/MgO slurry prepared above. The slurry was then spray dried at 350° F. and calcined at 1100°–1200° F. for about 1 hour.

EXAMPLE 6

Chemical/Physical Properties and Evaluation of Catalyst/Additive

Test samples were prepared which comprised 15 weight percent of the products of Examples 4 and 5, and 85 weight percent of a commercial zeolite-containing FCC catalyst (Orion 822 manufactured and sold by the Davison Chemical Division of W. R. Grace & Co.-Conn.). A base case (comparison) sample comprising 100% Orion 822 was also prepared.

The samples were calcined 3 hours at 1250° F., impregnated with V-naphthenate to a level of 5,000 ppm V, calcined 1 hour at 1450° F. to remove carbon, then steam deactivated at 1450° F., 80% steam-in-air for 5 hours. The steamed samples were evaluated for catalyst zeolite surface area retention and catalyst cracking activity and selectivity (MAT). The MAT tests were conducted at 980° F., 30 second contact time with a typical gas oil feedstock.

The test results using 100% Orion 822 catalyst as a control (base case) are summarized in Tables I and II. The results show that the compositions of Examples 4 and 5 produced higher retained zeolite surface areas after deactivation and substantially lower coke and Hz compared with the base case catalyst.

TABLE I

| Chemical/Physical Properties | | |
|---|---|---|
| Catalyst | Orion 822 (100%) | Composition of Example 4 (100%) |
| Chemical Analysis | | |
| $RE_2O_3$: W % | 1.43 | 26.7 |
| MgO: W % | — | 2.7 |
| $Al_2O_3$: W % | 33.0 | 33.7 |
| Physical Analysis | | |
| SA: $m^2/g$ | 286 | 153 |
| $H_2O$ PV: cc/g | 0.41 | 0.46 |
| DI: | 7 | 7 |
| ABD: g/cc | 0.74 | 0.75 |

| Catalytic Properties* | | |
|---|---|---|
| Catalyst | Orion 822 (100%) | Blend of Orion 822 (85%) Ex. 4 (15%) |
| Zeolite SA: $m^2/g$ | 46 | 78 |
| MAT: 5 cat. to oil ratio, 30 WHSV, 980° F. | | |
| Conv. W % | 48.0 | 61.5 |
| Coke: W % | 5.1 | 5.0 |
| $H_2$: W % | 0.70 | 0.47 |
| Gasoline: W % | 33.3 | 42.0 |

*Subsequent to impregnation with 5000 ppm V and deactivation with 1450° F., 80% steam/20% air for 5 hrs.

TABLE II

| Chemical/Physical Properties | | |
|---|---|---|
| Catalyst | Orion 822 (100%) | Composition of Example 5 |
| Chemical Analysis | | |
| $RE_2O_3$: W % | 1.43 | 26.2 |
| MgO: W % | — | 3.1 |
| $Al_2O_3$: W % | 33.3 | 33.5 |
| Physical Analysis | | |
| SA: $m^2/g$ | 286 | 57 |
| $H_2O$ PV: cc/g | 0.41 | 0.26 |
| DI: | 7 | 4 |
| ABD: g/cc | 0.74 | 0.98 |

| Catalytic Properties* | | |
|---|---|---|
| Catalyst | Orion 822 (100%) | Blend of Orion 822 (85%) Ex. 5 (15%) |
| Zeolite SA: $m^2/g$ | 57 | 71/68 |
| MAT: 4 cat. to oil ratio, 30 WHSV, 980° F. | | |
| Conv. W % | 50 | 57.0 |
| Coke: W % | 5.1 | 4.2 |
| $H_2$: W % | 0.68 | 0.59 |
| Gasoline: W % | 24.5 | 39.5 |

Subsequent to impregnation with 5000 ppm V and deactivation with 1450° F., 80% steam/20% air for 5 hrs.

EXAMPLE 7

Preparation of Zeolite-Containing Cracking Catalyst

Samples of zeolite-containing catalysts A and B were prepared which contain the following components:

| Catalyst A (Control) | | Catalyst B (Invention) | |
|---|---|---|---|
| Wt. % | Component | Wt. % | Component |
| 25 | USY Zeolite | 25 | USY Zeolite |
| 7 | $Al_2O_3$ from $Al_2(OH)_5Cl(2.5H_2O)$ | 7 | $Al_2O_3$ from $Al_2(OH)_5Cl(2.5H_2O)$ |

-continued

| Catalyst A (Control) | | Catalyst B (Invention) | |
|---|---|---|---|
| Wt. % | Component | Wt. % | Component |
| 38 | Acid Reacted Metakaolin/Alumina Sol Binder | 38 | Acid Reacted Metakaolin/Alumina Sol Binder |
| 30 | Kaolin | 28.9 | Kaolin |
| | | 1.1 | $RE_2O_3$ from La/Nd Oxalate |

Catalysts A and B were made by spray drying an aqueous slurry of USY zeolite, aluminum hydroxychloride sol, acid reacted metakaolin (of the type prepared in Example 1) and kaolin (which contained about 27 weight percent solids). Catalyst B (Invention) included rare earth oxalates which possessed a $La_2O_3/Nd_2O_3$ ratio of 6.86. The spray dried catalysts were then calcined for 30 minutes at 370° C. The catalysts were washed with aqueous $(NH_4)_2SO_4$ solution to reduce the soda level to <0.5 weight percent $Na_2O$. The catalysts were then oven dried at 120° C.

EXAMPLE 8

Chemical/Physical Properties & Evaluation of Zeolite-Containing Cracking Catalyst The chemical/physical/catalytic properties of Catalysts A and B of Example 7 were determined and are summarised below:

| | A (Control) | B (Invention) |
|---|---|---|
| Chemical/Physical Properties: | | |
| $La_2O_3$ wt. % | 0.01 | 0.96 |
| $RE_2O_3$ wt. % | 0.03 | 1.11 |
| $Na_2O$ wt. % | 0.27 | 0.30 |
| $Al_2O_3$ wt. % | 42.9 | 41.9 |
| Cl wt. % | 0.06 | 0.09 |
| TV @ 1750° F. wt. % | 13.9 | 13.7 |
| ABD, g/cc | 0.73 | 0.70 |
| DI | 5 | 7 |
| Unit cell size, Å | 24.58 | 24.59 |
| Zeolite SA. $m^2/g$ | 152 | 157 |
| Catalytic Properties* | | |
| 1700 ppm Ni + 3300 ppm V | | |
| MA wt. % | 52 | 59 |
| $H_2$ wt. % | 0.87 | 0.77 |
| Coke wt. % | 6.4 | 9.2 |
| 2500 ppm Ni + 5000 ppm V | | |
| MA wt. % | 45 | 55 |
| $H_2$ wt. % | 0.86 | 1.15 |
| Coke wt. % | 6.1 | 9.7 |

*Subsequent to impregnation with Ni + V and deactivation with 1400° F., 100% steam, 5 psig for 6 hours.

I claim:

1. A composition comprising discrete particles of a rare-earth compound selected from the group consisting of a rare-earth oxide, oxychloride and mixtures thereof dispersed in an acid reacted metakaolin matrix.
2. The composition of claim 1 which contains up to about 10 weight percent alumina binder.
3. The composition of claim 1 wherein the acid reacted metakaolin has the mole composition 0.8 to 1.0 $Al_2O_3.2\ SiO_2$ and a surface area of above 150 $m^2/g$.
4. The composition of claim 1 wherein the rare-earth component comprises at least about 40 weight percent lanthanum/neodynium expressed as $La_2O_3/Nd_2O_3$.
5. The composition of claim 1 which contains up to 10 weight percent alkaline earth metal oxide.
6. The composition of claim 1 which contains up to 50 weight percent zeolite/molecular sieve.
7. The composition of claim 1 having a particle size of 10 to 150 microns.
8. A catalytic cracking catalyst composition comprising a zeolite-containing cracking catalyst admixed with the composition of claim 1.
9. A method for preparing a particulate rare-earth-containing catalyst/additive composition which comprises:
    (a) preparing a slurry of rare-earth oxalate and acid reacted metakaolin;
    (b) spray drying the mixture; and
    (c) calcining the spray dried mixture at a temperature of 425° to 870° C.
10. The method of claim 9 wherein the slurry contains up to 10 weight percent alumina sol.
11. The method of claim 10 wherein the slurry is spray dried to obtain particles in the size range of about 10 to 150 microns, and an attrition index of 0 to 30 DI.
12. The method of claim 10 wherein the alumina sol is obtained by reacting acid reacted metakaolin slurry with aluminum metal powder.
13. The method of claim 10 wherein the alumina sol has the formula
    $Al_{2+\mu}(OH)_{3\mu}Cl_6$ wherein $\mu=$ about 4 to 12.
14. The composition of claim 5 wherein the alkaline earth metal oxide is magnesium oxide.
15. The method of claim 9 wherein the slurry includes an alkaline earth metal oxide.
16. The method of claim 15 wherein the alkaline earth metal oxide is magnesium oxide.
17. The method of claim 16 wherein the magnesium oxide is combined with a slurry of the rare-earth oxalate before mixing with a slurry of the acid reacted metakaolin.
18. The method of claim 9 wherein a zeolite/molecular sieve is included in said slurry.

* * * * *